June 8, 1965 R. L. KING, JR., ETAL 3,188,456

MAGNETIC MODULATOR FOR COMPUTING DIVISIONS AND MULTIPLICATIONS

Filed Aug. 24, 1961 3 Sheets-Sheet 1

RAYMOND L. KING JR.
ROBERT L. CONGER
*INVENTORS*

*BY*

J. M. St. Amand
*ATTORNEY*

MAGNETIC MODULATOR FOR COMPUTING DIVISIONS AND MULTIPLICATIONS

Filed Aug. 24, 1961 3 Sheets-Sheet 2

RAYMOND L. KING JR.
ROBERT L. CONGER
*INVENTORS*

BY

J. M. St. Amand
*ATTORNEY*

RAYMOND L. KING JR.
ROBERT L. CONGER
*INVENTORS*

*BY*

J. M. St. Amand
*ATTORNEY*

United States Patent Office 3,188,456

Patented June 8, 1965

3,188,456

MAGNETIC MODULATOR FOR COMPUTING DIVISIONS AND MULTIPLICATIONS

Raymond L. King, Jr., Arlington, and Robert L. Conger, Riverside, Calif., assignors to the United States of America as represented by the Secretary of the Navy Filed Aug. 24, 1961, Ser. No. 133,748
2 Claims. (Cl. 235—194)
(Granted under Title 35, U.S. Code (1952), sec. 266)

The invention herein described may be manufactured and used by or for the Government of the United States of America for governmental purposes without the payment of any royalties thereon or therefor.

The present invention relates to analog computers and more particularly to a magnetic modulator for use in computing divisions and multiplications in an analog computer.

The magnetic device of the present invention features a core of magnetic material in the shape of a hollow sphere having a large part of the four quadrants thereof removed, thus forming a core configuration of two like rings intersecting each other at right angles at the poles of the sphere.

Previous methods used to solve division and multiplication in analog computers involved: devices that were large in physical size and utilized many electronic tubes; more recent methods such as magnetic types using semiconductors, for example the Magnetic Analog Divider disclosed in copending application Serial No. 117,477, filed June 15, 1961; and other magnetic type devices which utilized more than one magnetic core. The present invention overcomes the disadvantages of the previous methods (i.e. large physical size, use of many electronic tubes, use of semiconductors, and use of more than one magnetic core) by means of a novel and unique magnetic core with various windings thereon.

It is an object of the invention, therefore, to provide a novel magnetic device for use in computing multiplications and divisions in an analog computer.

Another object of the invention is to provide a novel magnetic modulator using a core of a hollow spherical type construction.

A further object of the invention is to provide a novel magnetic modulator for performing analog division and multiplication using a single magnetic core.

Other objects and many of the attendant advantages of this invention will become readily appreciated as the same becomes better understood by reference to the following detailed description when considered in connection with the accompanying drawings wherein.

Referring now to the drawings like numerals refer to like parts in each of the figures.

Figure 1:
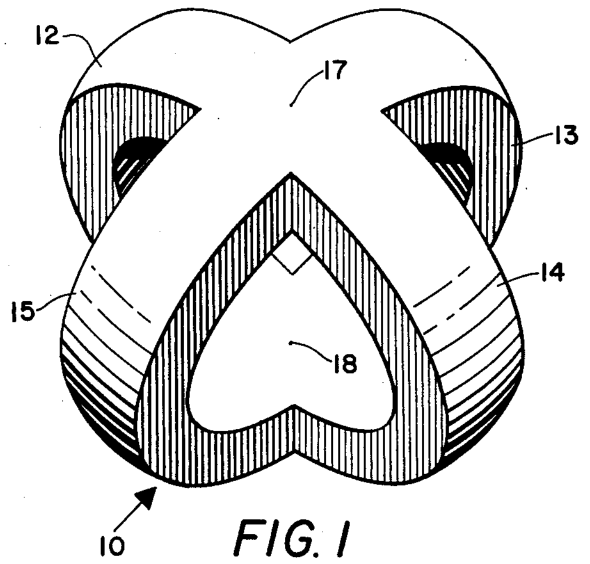
FIGURE 1 is a perspective view of a magnetic core in the shape of a hollow sphere having a large part of the four quadrants removed.
Figures 2, 4, 5:
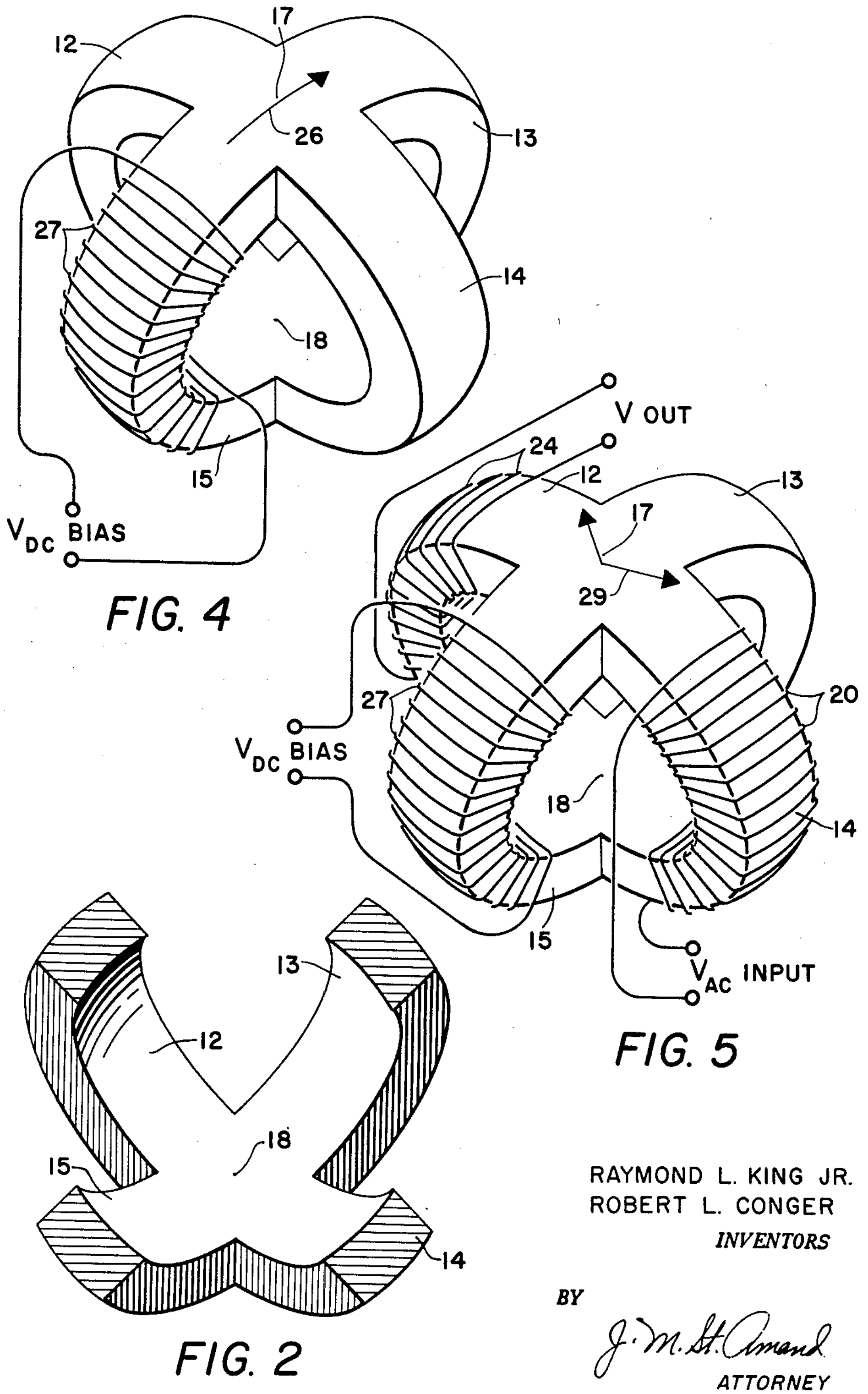
FIGURE 2 is a cross-sectional view along the line 2—2 of FIGURE 1.

The invention uses only one magnetic core, of ferrite or the like, having a hollow sphere type construction with a large portion of the four quadrants of the sphere removed. The resulting magnetic core 10 comprises four segments 12, 13, 14 and 15, of a hollow sphere connected together at the poles 17 and 18 thereof and of suitable wall thickness, as shown in FIGURES 1 and 2. Various windings, as hereinafter disclosed, can be wound about segments 12, 13, 14 and 15, and about pole junctions 17 and 18, for various operations of the magnetic device.

Figure 3:
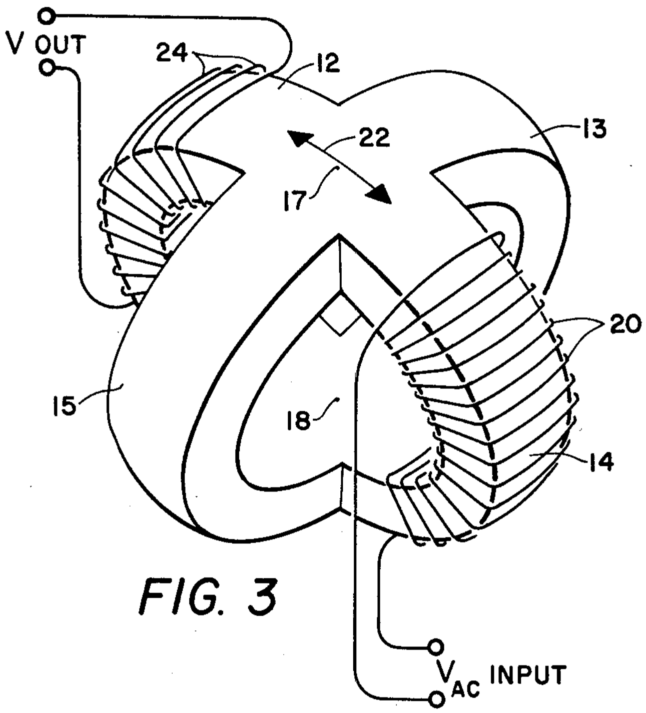
FIGURES 3, 4, 5, 6 and 7 show various embodiments of the invention using the magnetic core of FIGURE 1 with various arrangements of windings for different operations of the magnetic device.

The operation of the invention is dependent upon the arrangement of the windings, and by using different winding arrangements the device can be made to multiply and divide. For example, operation of the device as a divider can be shown as follows: In FIGURE 3, the magnetic flux path for alternating current input, $V_{A.C.}$, applied to winding 20, is shown at 22; an output winding (pickup coil) 24 is also shown. FIGURE 4 shows at 26, as a vector or arrow, the magnetic flux path for a direct current bias, $V_{D.C.}$, applied to winding 27. In FIGURE 5, a combination of FIGURES 3 and 4, having windings 20, 24 and 27 wound on respective segments 14, 12 and 15 of core 10, the resultant magnetization vector 29 is shown. From this it can be seen that the A.C. flux is modulated by the D.C. bias. This is represented by the vectors shown in FIGURE 5, which is the resultant of the interaction of vectors 22 and 26. If the A.C. input is held constant and the D.C. bias is increased, then the magnetic flux is decreased proportionally with the amount of D.C. bias and the output voltage, $V_{out}$, is decreased. This operation results in division and is operable over a range of D.C. bias until saturation of the core in the area of the poles 17 and 18 occurs.

Figure 6:
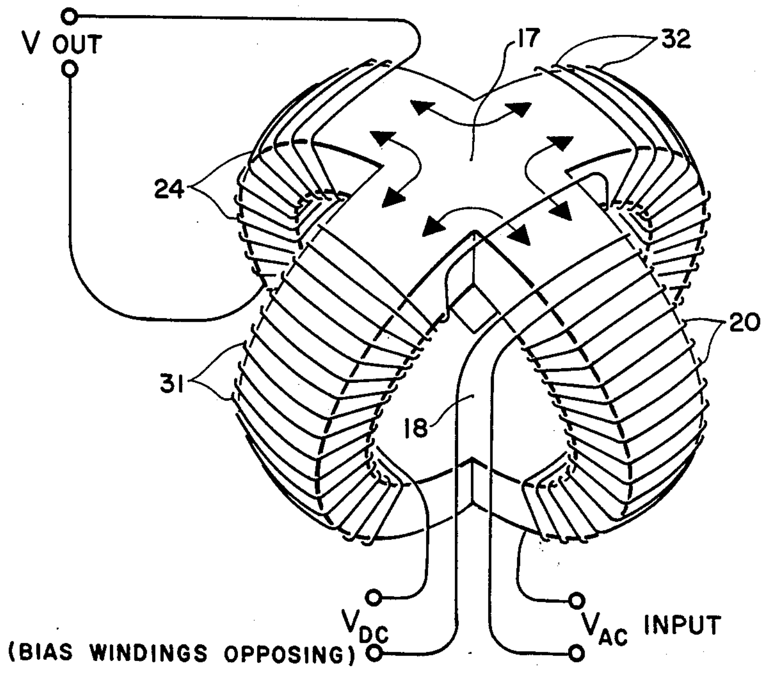

Another method of operation is shown in FIGURE 6. The core 10 is first wound with an input coil 20 and an output coil 24, and has a magnetic flux path for an A.C. input, as shown in FIGURE 3. Segments 13 and 15 are then wound with two bias windings, 31 and 32, in series opposing fashion, causing the magnetic flux path to spread in the core material at the poles, as shown by the arrows at pole 17 in FIGURE 6. This particular arrangement, as shown in FIG. 6, can perform division since the output decreases for an increase of a D.C. bias when the A.C. input is held constant.

Figure 7:
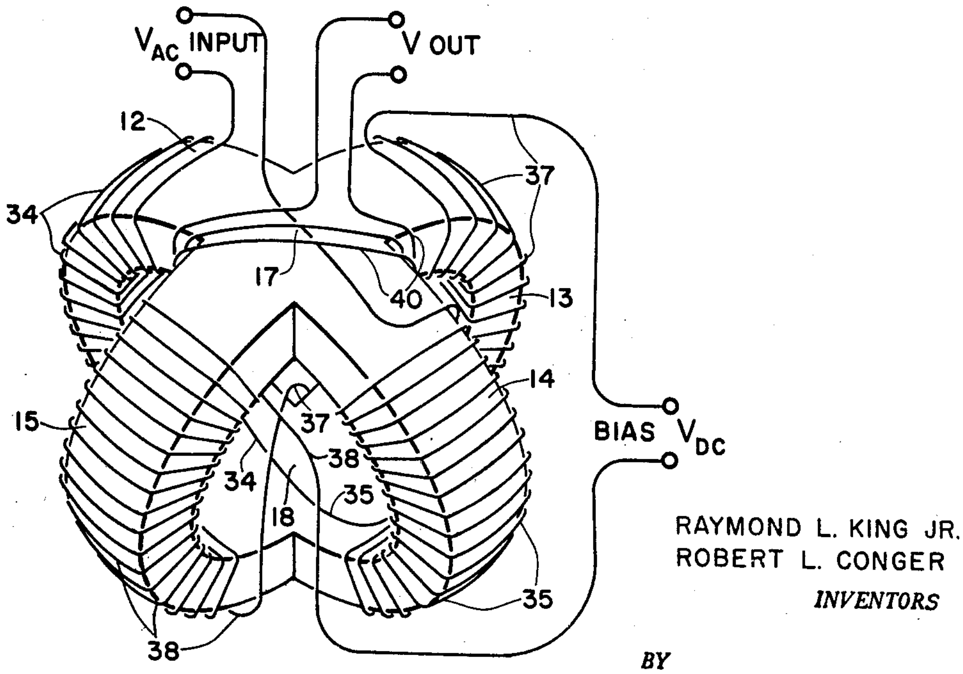

A method of operation that has advantages particularly as a multiplier is shown in FIGURE 7. This method involves, for example, two series-wound input windings 34 and 35 on segments 12 and 14, and two series-wound bias windings 37 and 38 on segments 13 and 15 respectively; in addition output windings are placed across the quadrant junctions or one or both of poles 17 and 18, such as winding 40, shown in FIGURE 7, for example. This particular arrangement of FIG. 7 can perform multiplication since the output increases for very low levels of input when the D.C bias is increased and the A.C. input is held constant.

The magnetic device of the present invention can also be made to operate differently than herein above described by using different arrangements of windings.

Obviously many modifications and variations of the present invention are possible in the light of the above teachings. It is therefore to be understood that within the scope of the appended claims the invention may be practiced otherwise than as specifically described.

What is claimed is:

1. As an article of manufacture, a one-piece magnetic core for magnetic apparatus comprising a hollow sphere of magnetic material having a desired wall thickness and having a large portion of each of the four quadrants of said sphere removed to form a solid one-piece magnetic core configuration of two like circular rings intersecting each other at right angles at the poles of said sphere.

2. A magnetic device comprising a hollow sphere of magnetic material having a desired wall thickness and having a large portion of each of the four quadrants of said sphere removed to form a magnetic core configuration of two like rings intersecting each other at right angles at the poles of said sphere, a plurality of electrical windings arranged on various portions of said core, said plurality of windings consisting of at least one input winding, at least one bias winding and at least one pick-off winding, an A.C. input applied to said at least one input winding for setting up an A.C. flux, a D.C. bias applied to said at least one bias winding for setting up a D.C. flux which modulates said A.C. flux, the resultant magnetic flux being detected by said pick-off winding, said at least one input winding being wound on portions of said magnetic core forming one of said two like intersecting rings and said at least one bias winding being wound on portions of said magnetic core forming the other of said intersecting rings, and said at least one pick-off winding being wound about at least one of the intersections of said rings at the poles of said sphere.

References Cited by the Examiner

UNITED STATES PATENTS

| | | | |
|---|---|---|---|
| 2,832,052 | 4/58 | Heartz | 235—178 |
| 2,921,253 | 1/60 | Liben | 235—196 |

FOREIGN PATENTS

| | | |
|---|---|---|
| 702,814 | 2/41 | Germany. |

OTHER REFERENCES

Langsdorf, S.N. 212,266, filed Feb. 23, 1951, abstract published 671 O.G. 1499.

MALCOLM A. MORRISON, *Primary Examiner.*

WALTER W. BURNS, Jr., *Examiner.*